RECORD CHANGER

Filed April 29, 1963 2 Sheets-Sheet 1

INVENTORS:
Ernest O. P. Tatter
Paul W. Schaff
By Hofgren, Wegner, Allen, Stellman & McCord Att'ys

RECORD CHANGER

Filed April 29, 1963 2 Sheets-Sheet 2

United States Patent Office 3,379,442

Patented Apr. 23, 1968

3,379,442

RECORD CHANGER

Ernest O. P. Tatter, Addison, and Paul W. Schaff, Arlington Heights, Ill., assignors to Warwick Electronics Inc., a corporation of Delaware Filed Apr. 29, 1963, Ser. No. 276,253
15 Claims. (Cl. 274—10)

ABSTRACT OF THE DISCLOSURE

A record changer including record support structure movable relative to a spindle for lowering an ejected record in a horizontal position to a turntable structure. The turntable structure includes first and second superposed turntables, with brake means being provided to stop the uppermost of the turntables during record lowering.

This invention relates to a record changer for a phonograph and more particularly to a record changer with a mechanism for supporting a record ejected from the record supporting spindle during the entire movement of the record to the turntable and a mechanism for stopping the record receiving turntable while the record is being placed on it.

In the past, in phonographs having a spindle supporting a stack of records threaded thereon above the turntable, when the lowermost record of the stack was ejected from the spindle, the record was freely dropped onto a rotating turntable or onto a record already on the turntable. This method of record changing has proved both irritating to the listener and harmful to the records being played.

The noise and record clatter created by dropping a record onto a moving turntable from its supported position above the turntable is unpleasant and annoying to people listening to the phonograph. Even more objectionable is the damage caused to the phonograph records. Repeatedly playing records on a phonograph having this type of record changer shortens the playing life of the records and substantially impairs the quality of the sound produced.

With a view to obviating the above-mentioned disadvantages, it is an object of this invention to provide a new and improved mechanism for changing records.

Another object of the present invention resides in providing a quieter record changer than is presently known in the art.

It is still another object of this invention to provide a record changer which eliminates any damage to the records during the record changing cycle.

It is also an object of the present invention to provide a mechanism for supporting a record ejected from the record spindle during its entire movement to the record receiving turntable of the phonograph.

A further object of the present invention is to provide a mechanism for stopping the rotation of the record receiving turntable while a record is being deposited thereon.

Another object of the invention is to provide a record changer having a spindle extending upwardly and centrally of a turntable and supported by a motorboard, said spindle having a shelf for supporting a stack of records above the turntable; retractable support means extending outwardly of the spindle for receiving a record ejected from the shelf on the spindle, the support means being mounted for movement lengthwise of the spindle for lowering a record ejected from the shelf of the spindle to the turntable and depositing the record thereon; means for retracting the support means within the spindle; and means for passing the support means in retracted position upwardly through the central aperture of a record deposited on the turntable.

Another object of this invention is to provide a record changer having a motorboard, first turntable positioned above the motorboard and mounted thereon for rotation, a second turntable positioned above the first turntable and mounted for rotation therewith, a spindle extending upwardly centrally of the turntables and supported by the motorboard for supporting a stack of records, means for ejecting the lowermost record in the stack from the spindle for movement to the second turntable and means for stopping the rotation of the second turntable during movement of the ejected record to the second turntable.

Further objects and advantages will become apparent from the following detailed description taken in connection with the accompanying drawings in which.

Figure 1:
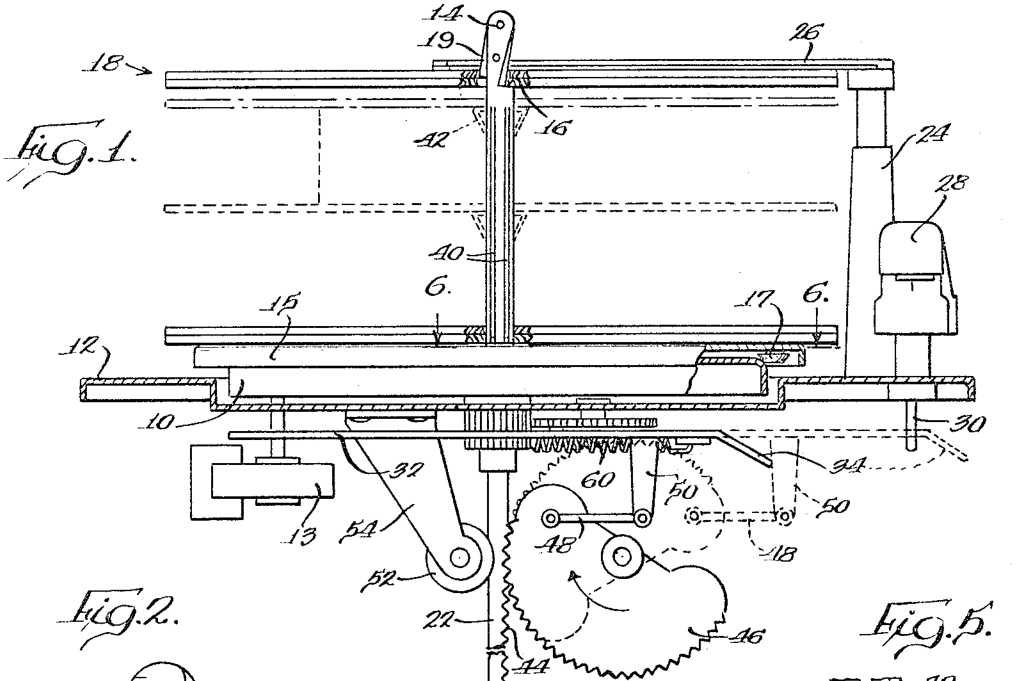
FIGURE 1 is a side elevational view of the record changer showing a record being lowered to a turntable.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in the drawings, the preferred embodiment of the record changer has a first turntable 10 above a motorboard 12 and supported thereon for rotation. The motorboard 12 is mountable within the phonograph cabinet (not shown). The turntable 10 is rotatable at a selected speed by the turntable motor 13 fixedly connected to the motorboard 12.

Figure 7:
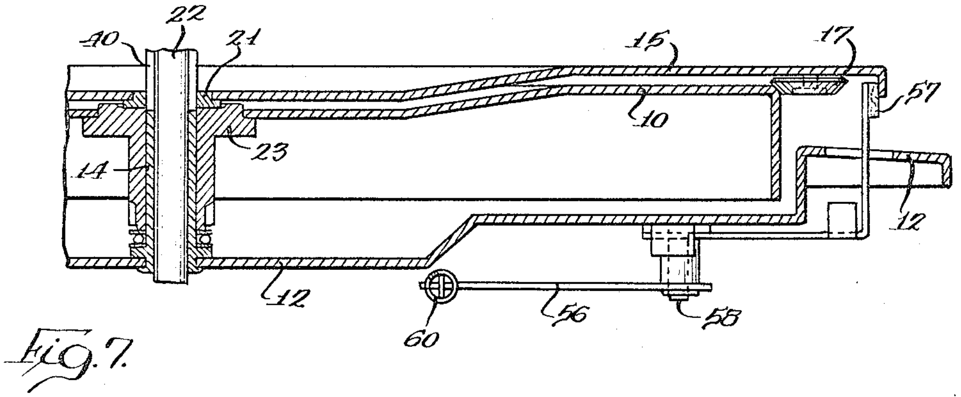
FIGURE 7 is a fragmentary sectional view taken along line 7—7 of FIGURE 6.

A second turntable 15 which is concentric with turntable 10 is positioned above turntable 10 and is substantially parallel thereto as best seen in FIGURE 7. Upper turntable 15 carries a plurality of frictional drive rollers 17 which frictionally engage turntable 10 for rotatively driving turntable 15. In the embodiment shown, upper turntable 15 has three drive rollers spaced at 120° for frictionally engaging turntable 10. Upper turntable 15 is centrally supported by a washer 21 which, in turn, is carried on a bushing 23. Washer 21 is made of a low frictional material so that the mating surfaces of washer 21 and bushing 23 move relatively free of friction.

Extending upwardly and centrally of the turntable 15 is a spindle 14 which is supported by the motorboard 12. The spindle 14 has a shelf 16 for supporting a record stack shown generally at 18.

In the preferred form shown, spindle 14 has a record ejecting mechanism, as well known in the art, including a pivotally mounted ejector lever 20 which has a path of movement which can shift the lowermost record of stack 18 from the shelf 16 whereby the record is placed in a position for movement to the upper turntable 15. Spindle 14 has a retainer plate 19 slidably carried thereon for preventing the other records from being ejected from the shelf 16 by ejector lever 20.

Figure 2:
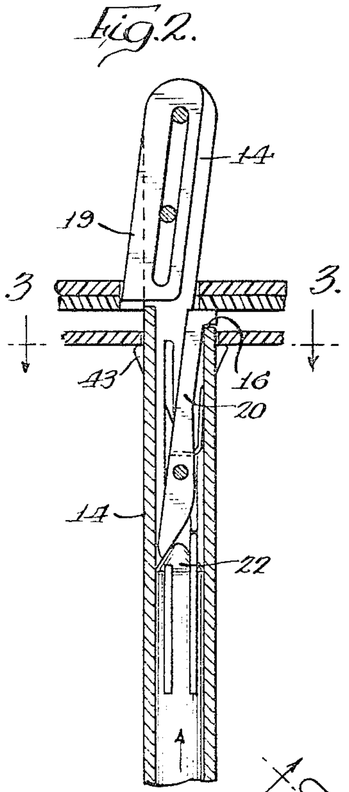
FIGURE 2 is an enlarged fragmentary side elevational view of the spindle and the record ejecting and lowering mechanism.

The operation of ejector lever 20 is effected in a well-known manner by vertical movement of a push rod 22 passing upwardly through the hollow spindle 14 and into engagement with the ejector lever 20 to pivot it into its record ejecting position as best seen in FIGURE 2.

It is, of course, understood that the present invention can likewise be embodied in a phonograph having a side ejector mechanism, that is, one in which the ejector lever is not carried in the record spindle, but rather is positioned adjacent the record stack for ejecting a record by engaging the outer edge of such record.

An upright post 24 is mounted on the motor board 12 adjacent the turntable 15. The post 24 has a telescopically mounted, swingable holddown arm 26 for engaging the top record of the stack 18 for holding records in a horizontal position on the spindle 14 above the turntable 15. As is well known in the art, the arm 26 may be raised and pivoted away from its position overlying the record stack so that the records may be removed from the spindle or more records may be added to the stack.

Tone arm 28 is pivotally mounted on motorboard 12 in the conventional manner and is operated in up and down movements by the vertical shift of a tone arm engaging pin 30 which extends beneath the motorboard 12 to an exposed position whereupon vertical movement of pin 30 results in corresponding vertical movement of the tone arm 28.

A record change cycle including operation of the record ejecting lever 20 and tone arm 28 is caused by the action of main slide plate 32 which is mounted beneath the motorboard for reciprocal movement, as is well known in the art. The main slide plate 32 has an inclined flange 34 for actuating pin 30 and other surfaces for controlling tone arm 28.

The present invention provides mechanism for positively lowering a record ejected from shelf 16 during the entire movement of the record to the upper turntable 15 and mechanism for stopping the rotation of turntable 15.

Figure 4:
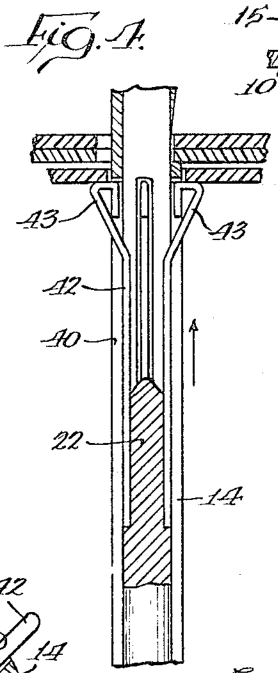
FIGURE 4 is a fragmentary sectional view taken along line 4—4 of FIGURE 3.
Figure 5:
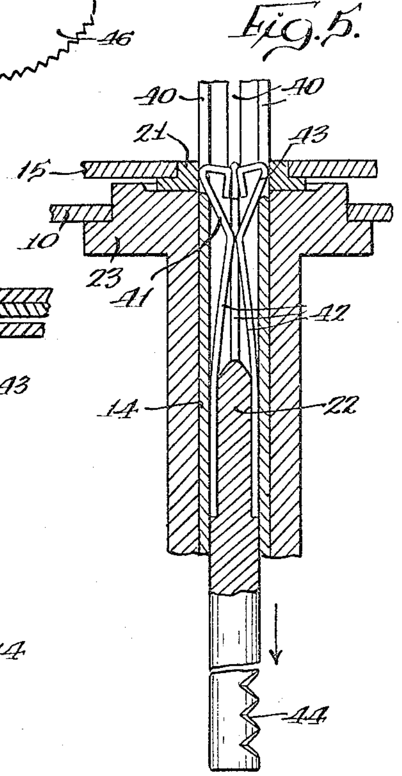
FIGURE 5 is a fragmentary sectional view showing the record lowering supports in retracted position.
Figure 3:
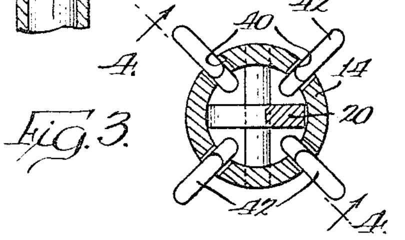
FIGURE 3 is an enlarged horizontal sectional view taken generally along the line 3—3 in FIGURE 2.
Figure 6:
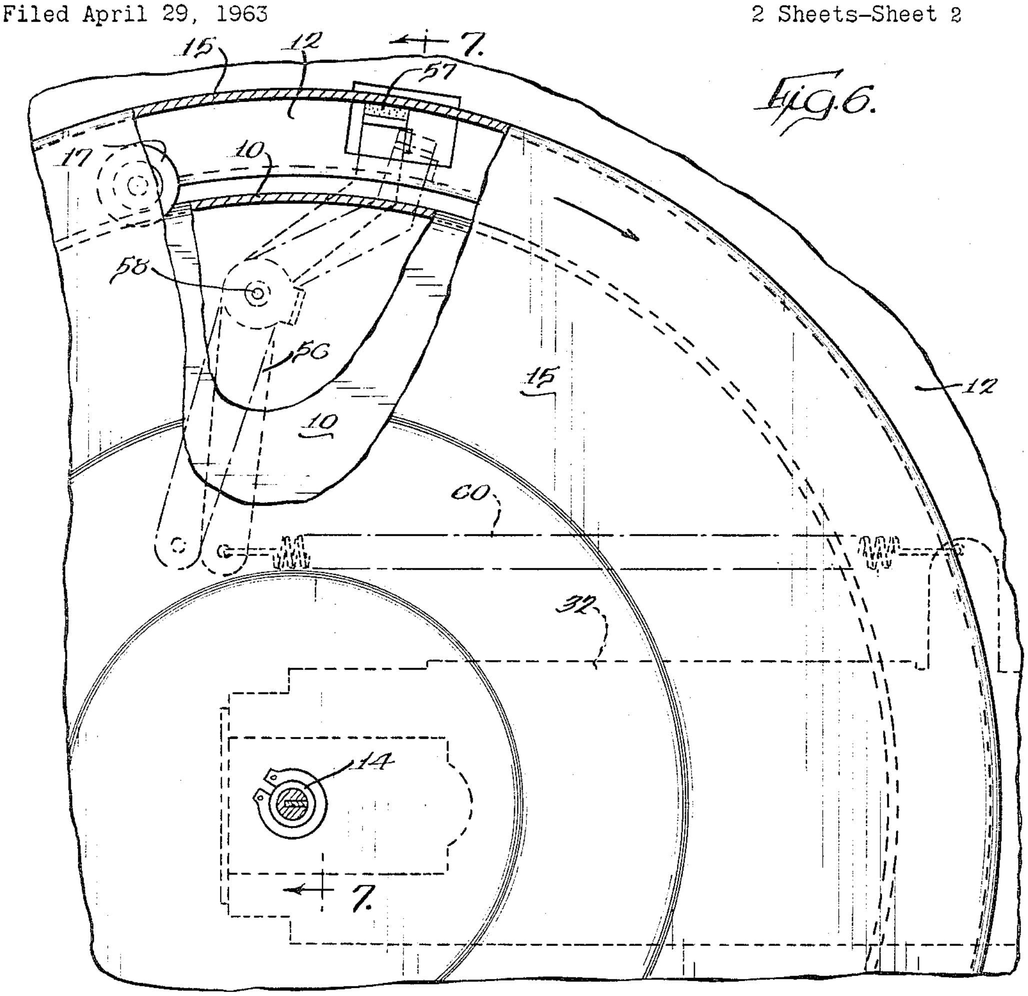
FIGURE 6 is an enlarged fragmentary sectional view taken along line 6—6 of FIGURE 1.

The mechanism includes the spindle 14 having longitudinal slots 40 therein which extend from just below the shelf 16, as shown in FIGURE 4, to slightly below the top of the turntable 15, as shown in FIGURE 5. Extending outwardly of the spindle 14 through the slots 40 are retractable supports 42 for receiving a record as it is ejected from shelf 16 and placed in a position for movement to the turntable 15. While the preferred embodiment shows four such supports and slots (FIGURE 3), it is not intended to limit the invention to this number of supports and slots, as it is recognized that fewer or more may be readily utilized.

The supports may be of any suitable material such as, by way of example and not limitation, tempered steel stampings, music wire, or plastic.

The supports 42 are retractable in that they have cam portions 43 which are engageable with the washer 21 for retracting the supports 42 within the spindle 14 so that the supports 42 can be raised upwardly through the central aperture of the record on the turntable and returned to their record receiving position adjacent the shelf 16.

When one or more records have already been deposited on the turntable and the next record is lowered to the record stack on the turntable 15, the supports are retracted as their cam portions 43 engage the uppermost record of the stack on the turntable 15 and when the supports 42 are raised, they are held in their retracted position within the spindle 14 by the inner edge of the holes in the records on the turntable.

In the embodiment shown, the lower portions of the supports 42 are fixedly secured to the vertically movable push rod 22 for movement therewith. Thus, while in the preferred embodiment shown, the supports 42 are retracted by flexing, it is understood that the supports 42 may be pivotally secured to the push rod 22 for retraction within the spindle 14.

The push rod 22 has a toothed lower portion 44 extending below the motorboard 12 for cooperation with the rotatably mounted toothed drive plate 46 which is rotated by link 48 which is connected to the main slide plate 32 by arm 50. The lower portion of push rod 22 is guided by guide wheel 52 which is carried in support member 54 mounted on motorboard 12.

The rotation of upper turntable 15 is stopped during the lowering of an ejected record by a brake mechanism. A brake arm 56 having a brake shoe 57 is pivotally mounted by pin 58 to motorboard 12 for movement into and out of engagement with the upper turntable 15 to overcome the frictional drive imparted by drive rollers 17 to stop the rotation of the upper turntable 15. The brake arm 56 is actuated by the movement of slide plate 32 through a connecting helical spring 60, the spring being tensioned to swing brake arm 56 into braking engagement with turntable 15 when the slide plate moves toward the right. The brake arm 56 is moved out of braking position when the tension in spring 60 is released by movement of slide plate 32 to its left position.

The record changing mechanism operates as follows: To begin a record change cycle, the main slide plate 32 begins rectilinear movement from the full line position shown in FIGURE 1 toward its broken line position. As slide plate 32 begins to move toward the right, spring 60 pivots brake arm 56 about is pivot 58 and moves brake shoe 57 into frictional engagement with upper turntable 15 to stop its rotation.

The movement of slide plate 32 toward the right also rotates drive plate 46 from its full line position, as seen in FIGURE 1, toward its broken line position thus raising push rod 22 into engagement with ejector lever 20 to eject a record from shelf 16 in the conventional manner. Push rod 22 carries record supports 42 adapted to receive the ejected record as it is moved off of shelf 16.

As slide plate 32 is moved toward the right, inclined flange 34 of slide plate 32 actuates pin 30 to raise tone arm 28. The movement of slide plate 32 also swings the tone arm horizontally out of its record playing position, as is well known in the art.

After the tone arm 28 has been raised and swung outward, the rotation of turntable 15 stopped, and a record ejected, the slide plate 32 begins its rectilinear movement toward the left and drive plate 46 is rotated counterclockwise toward its full line position, as seen in FIGURE 1, thus lowering push rod 22 and the record bearing supports 42. Push rod 22 is lowered to a position such that the top of record bearing supports 42 are just below the top of upper turntable 15 to deposit the record on the turntable 15. The supports 42 are retracted within spindle 14 as the cam portions 43 of the supports 42 are wedged inwardly by engagement with the washer 21 of turntable 15, as seen in FIGURE 5.

After the ejected record has been deposited on the turntable 15, further leftward movement of slide plate 32 releases the tension in spring 60 so that the rotative drive force being imparted to turntable 15 causes brake arm 56 to be pivoted out of braking engagement with turntable 15. Slide plate 32 also disengages pin 30 for lowering the tone arm 28 into record playing position.

We claim:

1. A record changer comprising: a motorboard; a first turntable positioned above the motorboard and mounted thereon for rotation; a second turntable positioned above said first turntable and engaging said first turntable for rotation therewith; a spindle extending upwardly centrally of the turntables and supported by the motorboard for supporting a stack of records; means for ejecting the lowermost record in said stack from said spindle for movement to said second turntable; a movable plate mounted on the motorboard; brake means carried on said motorboard selectively engageable with the second turntable for stopping the rotation of said second turntable during the movement of an ejected record to said second turntable; and means connecting the brake means to the movable plate for moving the brake means into and out of engagement with said second turntable.

2. A record changer comprising: a motorboard; a first turntable positioned above the motorboard and mounted thereon for rotation; a second turntable concentric with the first turntable positioned above said first turntable and substantially parallel thereto; frictional drive means carried on said second turntable frictionally engaging said first turntable for rotatably driving said second turntable; a spindle extending upwardly and centrally of said turntables and supported by the motorboard for supporting a stack of records; means for ejecting the lowermost record in said stack from the spindle for movement to said second turntable; a slide plate mounted beneath said motorboard for reciprocal movement; a brake arm pivotally mounted on said motorboard for selectively frictionally engaging said second turntable to overcome the frictional drive imparted by said drive means for stopping the rotation of the second turntable during movement of an ejected record toward the second turntable; and means connecting said brake arm to said slide plate for pivoting said brake arm into and out of engagement with said second turntable.

3. A record changer as specified in claim 2 wherein the means connecting said brake arm to said reciprocal slide plate comprises a helical spring, said spring being tensioned by movement of said plate in one direction for pivoting said brake arm into frictional engagement with the second turntable to stop the rotation of the second turntable, the tension of said spring being released by movement of said reciprocal slide plate in an opposite direction and said brake arm being swung out of braking engagement with said second turntable by the rotation of the second turntable.

4. A record changer comprising: a motorboard; a first turntable positioned above the motorboard and mounted thereon for rotation; a second turntable positioned above said first turntable and mounted for rotation therewith; a spindle extending upwardly centrally of the turntables and supported by the motorboard for supporting a stack of records; means for ejecting the lowermost record in the stack from the spindle for movement to the second turntable; record support structure movably mounted in said spindle for positively lowering an ejected record during substantially its entire movement to the second turntable, said record support structure including means providing at least three point support to define in effect a horizontally disposed record supporting platform for holding an ejected record in a horizontal position throughout its movement to directly deposit the ejected record upon the second turntable or upon a record thereon; and means for stopping the rotation of said second turntable during the movement of an ejected record toward said second turntable.

5. A record changer comprising: a motorboard; a first turntable positioned above the motorboard and mounted thereon for rotation; a second turntable concentric with the first turntable and positioned above the first turntable and mounted for rotation therewith; a spindle extending upwardly centrally of the turntables and supported by the motorboard for supporting a stack of records; means for ejecting the lowermost record in said stack from said spindle for movement to the second turntable; a rod mounted for movement lengthwise of said spindle; means mounted on said motorboard for moving said rod lengthwise of the spindle; retractable support means carried on said rod and extending outwardly of said spindle for receiving the lowermost record of said stack as said record its ejected from said spindle for controlling the movement of said record during substantially the entire movement to the second turntable said record being deposited on the second turntable by said support means; and a movable plate mounted beneath the motorboard; brake means carried on said motorboard selectively engageable with the second turntable for stopping the rotation of the second turntable during movement of an ejected record toward the second turntable; and means connecting said brake means with the movable plate for moving the brake means into engagement with said second turntable.

6. A record changer as specified in claim 5 wherein said retractable support means has a cam portion thereon for engaging a portion of the second turntable to guide said support means within said spindle, said support means remaining within the spindle until a portion of said support means is returned to a position above the record deposited on the second turntable.

7. A record changer comprising: a motorboard; a first turntable positioned above the motorboard and mounted thereon for rotation; a second turntable concentric with the first turntable positioned above the first turntable and mounted for rotation therewith; drive means carried on the second turntable frictionally engaging said first turntable for rotatively driving the second turntable; a spindle extending upwardly centrally of the turntables and supported by the motorboard, said spindle having a shelf for supporting a record stack threaded thereon, said spindle having a plurality of slots therein, said slots having a lower end below the top of the second turntable; means associated with said spindle for ejecting the lowermost record in said stack from said shelf for movement to the second turntable; retractable support means associated with said spindle and extending outwardly of the spindle through said slots for receiving a record ejected from said shelf, said support means being mounted for movement lengthwise of said spindle for lowering an ejected record to the second turntable and depositing it thereon, said support means being engageable with said second turntable for guiding the support means within the spindle for upward movement toward the shelf; a slide plate mounted beneath said motorboard for reciprocal movement; a brake arm pivotally mounted on said motorboard for selectively frictionally engaging said second turntable to overcome the frictional drive imparted by said drive means for stopping the rotation of the second turntable during the movement of an ejected record toward the second turntable; and means connecting a brake arm to said slide plate for pivoting the brake arm into and out of engagement with the second turntable.

8. A record changer comprising: a motorboard; a turntable above the motorboard and mounted thereon for rotation; a spindle extending upwardly centrally of the turntable and supported by the motorboard, said spindle having a shelf for supporting a record stack above said turntable; a lever pivoted to said spindle for ejecting the lowermost record of said stack from said shelf; a push rod mounted for movement lengthwise of said spindle for pivoting said lever to eject the lowermost record of said stack; means for moving said push rod lengthwise of said spindle; and retractable support structure extending outwardly of said spindle for receiving from said shelf a record ejected therefrom, said support structure being mounted on said push rod for movement therewith for positively lowering said record and directly depositing it on the turntable, said support structure including means providing at least three point support for said record to define in effect a horizontally disposed record supporting platform for holding the ejected record in a horizontal position throughout its movement, said support means being retractable within said spindle and being returnable to a position for receiving another record from said shelf.

9. A record changer comprising: a motorboard; a turntable positioned above the motorboard and mounted thereon for rotation; a spindle extending upwardly centrally of the turntable and supported by the motorboard for supporting a stack of records; means for ejecting the lowermost record in said stack from the spindle for movement to the turntable; support structure associated with said spindle, said support structure including means providing at least three point support for supporting a record horizontally; and means for moving said support structure lengthwise relative to said spindle between a record receiving position above the turntable and a record depositing position at the level of the turntable where support of the ejected record is directly transferred to the turntable or to a record on the turntable, said record support structure means positively lowering an ejected record in a horizontal position during the entire movement from the record receiving position to the record depositing position.

10. A record changer as defined in claim 9 in which said support structure means is movable between a record supporting position outwardly of said spindle and a retracted position within said spindle, and wherein said support structure means includes a cam portion engageable with the turntable or with a record on the turntable to move the support structure means from said record supporting position to said retracted position.

11. A record changer as defined in claim 10 in which said support structure means is defined by a plurality of support members, each having an outwardly extending cam surface adjacent the upper end thereof to define said cam portion.

12. A record changer as defined in claim 11 in which at least three support members are provided, and wherein said support members each have a generally horizontally disposed upper end which form said means providing at least three point support.

13. A record changer comprising: a motorboard; a turntable above the motorboard and mounted thereon for rotation; a spindle extending upwardly centrally of the turntable and supported by the motorboard, said spindle having means for supporting a record stack above said turntable; means associated with said spindle for ejecting the lowermost record of said stack from said supporting means; an actuator mounted for movement relative to said spindle for operating said ejector means to eject the lowermost record of said stack; means for moving said actuator relative to said spindle; retractable support structure extending outwardly of said spindle for receiving from said supporting means a record ejected therefrom; means for moving said retractable support structure relative to said spindle for positively lowering said record and directly depositing it on the turntable, said retractable support structure including means forming at least a three point record support to define in effect a horizontally disposed record supporting platform for holding the ejected record in a horizontal position throughout its movement, said support structure means being retractable within said spindle and being returnable to a position adjacent said supporting means for receiving another record.

14. A record changer as defined in claim 13 wherein said retractable support structure means is carried by said actuator.

15. In a record changer having a turntable and a spindle extending centrally from the turntable for guiding a record to the turntable, means for supporting a stack of records on the spindle spaced from the turntable, and means for lowering a record from the stack to the turntable including an actuator mounted in the spindle for up and down movement, a plurality of elongate slots in said spindle extending from above to below said turntable, at least three fingers connected to said actuator and extending upwardly therefrom and out of the spindle through said slots to define a plane normal to said spindle, and fingers having laterally extending V-shaped upper ends, the upper surface of said upper ends being aligned and positioned immediately beneath the record stack when the actuator is in its uppermost position and said upper ends being at or below the level of the turntable when the actuator is in its lowermost position, means mounting said fingers for yieldable retraction to positions within the spindle, cam means defined by a leg of the V-shaped upper ends for retracting the fingers into the spindle as the fingers descend and the cam means moves into the hole of a record already on the turntable or when the cam means moves into an opening in the turntable and also when a record is moved up along the spindle for record removal.

References Cited

UNITED STATES PATENTS

| | | | |
|---|---|---|---|
| 2,689,735 | 9/1954 | Morrison | 274—10 |
| 2,809,840 | 10/1957 | Mueller | 274—10 |
| 2,949,307 | 8/1960 | Mueller | 274—10 |
| 2,512,701 | 6/1950 | Weaver | 274—10 |
| 2,544,230 | 3/1951 | Johnson | 274—10 |
| 2,626,157 | 1/1953 | Jablonski | 274—10 |
| 2,627,414 | 2/1953 | Sear | 279—9 |

NORTON ANSHER, *Primary Examiner.*

J. F. PETERS, W. E. JACKSON, *Assistant Examiners.*